United States Patent [19]

Peyrouset et al.

[11] 4,436,658

[45] Mar. 13, 1984

[54] PROCESS OF EXTRACTION OF LACTOFERRINE AND IMMUNOGLOBULINS OF MILK

[75] Inventors: André Peyrouset, Ger; François Spring, Pau, both of France

[73] Assignee: Societe Nationale Elf Aquitaine, France

[21] Appl. No.: 377,316

[22] Filed: May 12, 1982

[30] Foreign Application Priority Data

May 15, 1981 [FR] France ................. 81 09740

[51] Int. Cl.$^3$ ................. A23J 1/20
[52] U.S. Cl. ................. 260/122; 260/112 R; 260/120; 426/271; 426/657
[58] Field of Search ............ 260/120, 122, 112 R

[56] References Cited

U.S. PATENT DOCUMENTS

| 3,234,199 | 2/1966 | Reid | 260/112 |
|---|---|---|---|
| 3,487,064 | 12/1969 | Swanson et al. | 260/112 |
| 3,547,900 | 12/1970 | Dienst et al. | 260/112 |
| 3,969,337 | 7/1976 | Lauer et al. | 260/112 |
| 4,018,752 | 4/1977 | Buhler et al. | 260/112 |
| 4,100,149 | 7/1978 | Meiller et al. | 260/112 |
| 4,229,342 | 10/1980 | Mirabel | 260/120 |
| 4,265,924 | 5/1981 | Buhler et al. | 260/122 |
| 4,291,067 | 9/1981 | Buhler et al. | 260/122 |

OTHER PUBLICATIONS

Biochimica et Biophysica Acta, vol. 60, No. 2, pp. 410–411, (1962), Gordon et al.

*Primary Examiner*—Howard E. Schain
*Attorney, Agent, or Firm*—Ostrolenk, Faber, Gerb & Soffen

[57] ABSTRACT

From an aqueous medium derived from milk substantially free from caseins, proteins are extracted, particularly lactoferrine and immunoglobulins, by adsorption on a solid support. The aqueous medium is weakly basic, while elution is effected by means of an acid solution.

7 Claims, No Drawings

PROCESS OF EXTRACTION OF LACTOFERRINE AND IMMUNOGLOBULINS OF MILK

The present invention relates to an improved process for the extraction of certain proteins from dairy products. It relates particularly to production of the iron-fixing proteins, transferrine and lactoferrine, as well as to immunoglobulins.

The interest of various proteins other than casein which are found in mammalian milk has drawn the attention of numerous industries and workers. Also, tests have been carried out with a view to the separation of these various proteins, more particularly those found in whey, that is in lactoserum after separation of caseins. Among the most interesting substances in this category are the α-lactalbumins, transferrine, lactoferrine, lysozyme, serum-albumin, immunoglobulins etc. Lactoferrine not only has a nutritional interest, but also a pharmacological one. It is known, in fact, that this protein, which fixes iron, is not only of considerable alimentary utility for nursing babies, but also it constitutes a major protector against various bacterial infections. The latter role is explained by the chelating action of this protein vis-a-vis iron, which removes this element from the medium, thus preventing development of bacteria for which this element is absolutely necessary. This bacteriostatic property clearly represents an important advantage. As regards the immunoglobulins IgA, IgM and IgG, their importance increases daily with the prodigious development of immunology. On the other hand, the utility and applications of lactalbumins, serum-albumin, lysozyme and various other proteins are known and also of the proteins which fix vitamin B12 or ceruloplasmins having the property of combining with copper. It is thus easy to understand that work has been carried out with a view to the separation of these various proteins starting from dairy products and in particular, from whey which contains them in the dissolved state and which generally constitutes a residue in the dairy industry. Most of the processes utilized are based upon the application of ion exchangers or on chromatography using Sephadex, at pH values not exceeding 7 and most frequently below 6.3. This is the method recommended for example, in U.S. Pat. Nos. 3,234,199 and 3,969,337. Use has also been made of electrophoresis or the preciptation of salts and centrifugation, the latter method being described by Monteuil and Mullet, C. R. 250, 1736-7 (1960). More recently, work on the separation of milk proteins has been described in the publications of French Pat. Nos. 2390906 and 2399214, where the proteins other than casein are first extracted with an anion exchange resin and then with silica or vice versa. The extraction takes place at a pH in the range from 4 to 7.5.

While the various processes of the known art are suitable for the separation of proteins such as lactalbumins or serum-albumin, none of them allows the efficacious and practical production of the proteins which fix iron, that is to say transferrines and lactoferrines. While lacto-serum is not a very costly material, it only contains about 6.5 g of proteins per liter, a low proportion of which is constituted by lactoferrines. It is thus necessary to treat quite large volumes of this primary material in order to extract a small weight of the proteins of interest. It is consequently important to provide a process allowing this extraction to be carried out with as good yields as possible. It is this aim which is attained by the present invention. In fact, the novel process according to the invention particularly suits the production of ferro-chelating proteins, particularly lactoferrine and transferrine, and also the immunoglobulins, from milk serum remaining after separation of the caseins.

In the remainder of the present description, by way of simplification, reference is made only to lactoferrine, but it is to be understood that this term also comprises transferrine and, where appropriate, other ferro-chelating proteins of the same type which can exist in milks of various mammalian species.

The process according to the invention results from the discovery—contrary to the prior art—that the separation by adsorption of the proteins indicated takes place better in a slightly basic medium.

The process according to the invention consists in subjecting the medium containing lactoferrine to fixation on a suitable adsorbant in a weakly basic medium, namely in a liquid having a pH greater than 7.5. Preferably, the pH of the medium is from 7.7 to 8.8 and most preferably from 7.9 to 8.5.

The medium to be treated according to the invention can be constituted by an aqueous liquid containing various milk proteins, freed at least from the major part of the caseins. The most practical source is whey, if desired concentrated or already treated for the extraction of proteins other than lactoferrine.

After adsorption in the weakly basic medium and elimination of the supernatent liquid, the proteins fixed on the adsorbant are eluted by reducing the pH below 7 and preferably to about 4. The mode of operation preferred consists in utlizing an eluting acid, the ionic force of which has been increased by the addition of a soluble salt.

As regards the adsorbant, silica can advantageously be employed having a specific surface of about 5 to 150 $m^2/g$, having a pore diameter of 25 to 250 nm (250 to 2500 Å). The silica can be employed in a pulverulent form, having a sufficiently large particle size range, for example from 5 $\mu$m to 5 mm. For utilization in a column, it is preferably to utilise spheres having diameters of the order of 10 to 500 $\mu$m.

Although silica constitutes an excellent support for the preferential fixation of lactoferrine, other supports can also be employed, particularly various natural or artificial silicates, such as pumice, diatomaceous earths, bentonite etc, as well as active aluminas.

Fixation in the weakly basic medium has the advantage of a considerable selectivity vis-a-vis lactoferrine accompanied only by a part of the immunoglobulins. The other proteins, particularly lactalbumins, lactoglobulins, serum-albumin and the remainder of the immunoglobulins, remain in solution in the supernatant liquid.

After recovery of the lactoferrine and the immunoglobulins, the support—particularly silica—is contacted with a weakly basic solution, for example of pH 8 to 9, which makes it suitable for serving for a new extraction from a dairy product. It can be seen that the process according to the invention is much simpler than those of the prior art. Also, as regards the French patents cited above, a single mineral support is sufficient instead of two supports, one of which is an ion exchanger. Also, fixation takes place in a basic medium instead of being effected at pH values below 7.5 and in particular below 7, as in the case with all the prior art.

According to a variant of the invention, after elution of the support with an acid solution, the support is washed with a basic solution which allows extraction of the fraction of the immunoglobulins which has not been eluted in the acid medium. In this case, the basic solution can also allow recovery of a residue of lactoferrine. The washing according to this variant can be effected at a pH of 8 to 10 for example. However, the capacity of a silica support vis-a-vis lactoferrine is not influenced by such washing. The latter can thus be omitted when it is desired merely to extract the lactoferrine.

The process according to the invention applies to lactoserum irrespective of the mode of elimination of the casein which has produced the lactoserum; in other words, whether the protein has been precipitated by acidification of the initial milk or by the action or an enzyme. The process is suitable for whey per se, as well as for liquids obtained by dissolving lactoserum solids obtained by any known means, for instance ultrafiltration or desiccation.

The invention can be utilized for the extraction of lactoferrine from various kinds of milk in particular those of sheep or cattle, and also human milk. As the former contain much less lactoferrine than the latter, their treatment is less efficacious by known techniques and it is here that the utility of the invention is particularly apparent.

In an embodiment of the invention, fixation is carried out according to the invention of the lactoferrine containing weakly basic liquid on an adsorbant support, said lactoferrine containing medium having first added an iron compound to saturate all of the lactoferrine present as described by Gordon, Ziegler and Basch, Biophys., Acta 60, 410–411 (1962).

The rate of extraction of the lactoferrine by the process according to the invention is high. As regards the composition comprising proteins obtained by this process, following elution of the adsorbant support by an acid solution, it comprises about 50% of lactoferrine, the remainder being constituted principally by immunoglobulins. The purity of the lactoferrine, utilized essentially as a bacteriostatic agent, is entirely sufficient and it is not necessary to separate it from the immunoglobulins. In fact, it has been shown in vitro that the power of inhibition of the growth of pathogenic bacteria due to lactoferrine is increased by the presence of immunoglobulins.

In the case, very advantageous industrially, where the support is constituted by silica, it gives a capacity vis-a-vis lactoferrine of more than 20 milligrams per gram of silica, which substantially justifies the industrial application of the process according to the invention.

In the operative conditions of the invention, the immunoglobulins which accompany the lactoferrine do not undergo any denaturation and can consequently be utilized in the foodstuffs, pharmaceutical and veterinary industries because they preserve all their properties.

The various proteins which can be separated by the process of the invention are identifiable by standard methods and, in particular, by those described by J. Garnier in Ann. Biol. Anim. Bioch. Biophys. 1964, 4(2) 163–187. The examples which follow illustrate the present invention non-limitatively.

EXAMPLE 1

In a column of 1 cm inside diameter, 5 g of silica grains are placed having a particle size range of 100 to 200 μm. This silica has a specific surface of 20 m²/g and a pore diameter of 80 nm. The silica is washed with an 0.005 M solution of disodium phosphate, $Na_2HPO_4$.

In 1 liter of this same phosphate solution, are dissolved 10 g of a powder obtained by drying the solids recovered (the retained material) in the ultrafiltration of a lacto-serum. This powder contains 6.5 g of proteins. The pH of the solution obtained is adjusted to 8.2.

Then this solution is passed through the silica charge in the abovementioned column at a rate of 60 ml/h. This charge is then washed with an 0.005 M solution of disodium phosphate at pH 8.2, in order to remove all the proteins not fixed to the silica.

The fixed lactoferrine is then eluted with the aid of an 0.1 N acetic acid solution containing NaCl in a concentration of 0.5 M. A fraction is then obtained comprising 25 ml of a pink-coloured liquid, containing 40 mg of proteins constituted 66% by lactoferrine, the remainder being immunoglobulins. After washing of the silica charge by passage of an 0.005 M disodium phosphate solution, the column is ready for a new adsorption cycle.

EXAMPLE 2

In an operation similar to that of Example 1, the charge to the column is washed with a tris-HCl buffer containing 0.5 M NaCl, at pH 9 after acetic acid elution and recovery of the lactoferrine fraction. This provides a new fraction of 20 ml containing 30 mg of proteins essentially constituted by immunoglobulins, lactoperoxydase and a very small quantity of lactoferrine.

After washing the silica in the column with an 0.05 M disodium phosphate solution, the column is again ready for use.

EXAMPLE 3

The mode of operation of Example 1 is repeated but the source of lactoferrine is constituted by 1 liter of whey obtained directly from the manufacture of cheese, without concentration, the liquid containing 0.005 M of disodium phosphate per liter. The results are the same as in Example 1.

EXAMPLE 4

The alkaline washing of Example 2 is applied to a mode of operation utilizing whey according to Example 3. This leads to identical results of those of Example 2.

We claim:

1. In a process of extraction of iron-fixing milk proteins, from an aqueous medium substantially free from caseins by adsorption on a solid support followed by elution of the adsorbed proteins by means of an acid solution, the improvement which comprises effecting the adsorption in a weakly basic medium at a pH of 7.7 to 8.8 on pulverulent silica having a particle size from 5 um to 5 mm, a specific surface of about 5 to 150 m²/g and a pore diameter of from 25 to 250 nm.

2. Process according to claim 1, where the elution takes place at a pH below about 4 and the eluant contains a soluble salt increasing its ionic force.

3. Process according to claim 1, in which the elution is followed by treatment with a basic solution and recovery of the immunoglobulins and lactoferrine thus liberated.

4. Process according to claim 1, where the iron-fixing proteins comprise lactoferrine in a liquid derived from milk.

5. Process according to claim 4, wherein the immunoglobulins and/or other proteins are recovered from the liquid remaining after adsorption of the lactoferrine.

6. Process according to claim 1, wherein the pH of the medium subjected to adsorption is in the range from 7.9 to 8.5.

7. Process according to claim 6, where the silica particle size range is from 10 to 500 um.

* * * * *